United States Patent [19]
LaMarche

[11] Patent Number: 5,078,499
[45] Date of Patent: Jan. 7, 1992

[54] OPTICAL INTERCONNECTION ARRANGEMENT

[75] Inventor: Robert E. LaMarche, Atlantic Highlands, N.J.

[73] Assignee: AT&T Bell Laboratories, Murray Hill, N.J.

[21] Appl. No.: 389,711

[22] Filed: Aug. 4, 1989

[51] Int. Cl.$^5$ .................. G03H 1/00; H04J 14/00; G02B 27/10; H04B 10/00
[52] U.S. Cl. ..................... 359/19; 359/115; 359/154; 359/619; 359/652; 359/664
[58] Field of Search ............ 350/3.6, 3.67, 3.68, 350/3.72, 162.11, 162.13, 174, 96.18, 167, 169, 413, 416; 455/600, 613, 617; 250/578; 364/822, 713; 370/1, 3, 4

[56] References Cited

U.S. PATENT DOCUMENTS

| | | | |
|---|---|---|---|
| 3,574,439 | 4/1971 | Gloge | 350/169 |
| 3,633,035 | 1/1972 | Uchida | 350/169 |
| 3,739,173 | 6/1973 | Broussaud | 370/3 |
| 3,831,035 | 8/1974 | Hill | 350/3.78 |
| 4,052,706 | 10/1977 | Spitz et al. | 350/3.6 |
| 4,549,313 | 10/1985 | Rozenwaig | 455/600 |
| 4,580,151 | 4/1986 | Bamba | 350/3.72 |
| 4,641,273 | 2/1987 | Casasent | 364/822 |
| 4,651,297 | 3/1987 | Schlunt | 350/162.13 |
| 4,705,344 | 11/1987 | Hinton et al. | |
| 4,733,093 | 3/1988 | Graves et al. | |
| 4,939,630 | 7/1990 | Kikuchi et al. | 350/167 |

FOREIGN PATENT DOCUMENTS

| | | | |
|---|---|---|---|
| 708180 | 4/1931 | France | 350/174 |
| 0060605 | 4/1985 | Japan | 370/1 |

OTHER PUBLICATIONS

Goodman et al, Proc. of the IEEE, vol. 72, No. 7, Jul. 1984, "Optical Interconenctions for VLSI Systems", pp. 850-866.

Lohmann et al., Applied Optics, vol. 25, No. 10, May 15, 1986, "Optical perfect shuffle", pp. 1530-1531.

Veldkamp et al., Optics Letters, vol. 11, No. 5, May 1986, "Coherent Summation of Laser Beams . . . ", pp. 303-305.

H. J. Caulfield, Applied Optics, vol. 26, No. 19, Oct. 1, 1987, "Parallel N$^4$ Weighted Optical Interconenctions", pp. 4039-4040.

*Primary Examiner*—Bruce Y. Arnold
*Assistant Examiner*—R. D. Shafer
*Attorney, Agent, or Firm*—Gregory C. Ranieri; Eli Weiss

[57] ABSTRACT

An optical interconnection arrangement having a high degree of connectivity and bandwidth is obtained by a non-collinear arrangement of lenses. In a preferred embodiment, the optical system comprises a first pupil lens, a second pupil lens and an array of fanout lenslets wherein the optical axes of the first and second pupil lenses are collinear. The first and second pupil lenses form an afocal system with the array of fanout lenslets situated between and at the focal planes of the first and second pupil lenses. Light beams from arrays of light emitting devices are collimated by input probe lenses that have their optical axes non-collinear with the optical axis of the first lens. The first pupil lens forms a coincident pattern of the arrays of light emitting devices. Additionally, the array of fanout lenslets fans out exiting beamlets comprising the coincident pattern such that each exiting beamlet substantially fills the aperture of the second pupil lens. Output probe lenses, similar to the input probe lenses, are positioned around the periphery of the second pupil lens. Each output probe lens images a representation of the coincident pattern to an array of light detecting devices which results in the establishment of a plurality of optical interconnections between the light emitting devices and the light detecting devices. Furthermore, the optical interconnections formed are independent of coherence, polarization or wavelength.

9 Claims, 6 Drawing Sheets

$\propto \Sigma[a_{N,N}]_i$   $\propto \Sigma[a_{N,2}]_i$   $\propto \Sigma[a_{N,1}]_i$

801

$\propto \Sigma[a_{2,N}]_i$   $\propto \Sigma[a_{2,2}]_i$   $\propto \Sigma[a_{2,1}]_i$ $\propto \Sigma[a_{1,N}]_i$   $\propto \Sigma[a_{1,2}]_i$   $\propto \Sigma[a_{1,1}]_i$

OPTICAL INTERCONNECTION ARRANGEMENT

TECHNICAL FIELD

This invention relates to optics and, more particularly, to an optical arrangement for interconnecting, via free space, light emitting devices to light detecting devices.

BACKGROUND OF THE INVENTION

Optics, because of its inherent parallelism and high bandwidth, has been utilized in the fields of computing, telecommunications and information processing. Today, at the forefront of research and development are interconnection arrangements harnessing the capabilities of optics. Whether using the media of free space or waveguide, transmission rates between electronic devices, optical devices or, on a larger scale, between electronic circuits boards have surpassed the practical limitations of electronic interconnections. Neither encumbered by parasitic capacitance, nor exacerbated by cross talk, electro-magnetic interference or signal delay variations, optical interconnections have afforded higher transmission rates.

The same qualities of optics which allow higher transmission rates, however, place severe interconnection constraints on the designed system's architecture. These constraints to some extent have been overcome by interconnection arrangements as exemplified in U.S. Pat. Nos. 4,705,344 and 4,733,093. These free space or waveguide interconnection arrangements have one thing in common and that is the conversion of an electrical signal to an optical signal for transmission. Typically, an electrical signal needs to be connected to different nodes. Electronic interconnections, mainly because of parasitic capacitance, are limited to a transmission rate of a few hundred megagbits per second. By converting electrical signals to optical signals for transmission via free space or waveguide, optical interconnection arrangements have afforded transmission rates in the gigahertz regime.

FIG. 1 illustrates a typical optical interconnection arrangement known in the prior art to interconnect various points via optical fibers. Electrical signals are converted to optical signals and transmitted to various other nodes by fibers. The optical signals are, then, reconverted to electrical signals by light detecting devices. Although this arrangement is practical for a large number of point to point interconnections, multipoint to multipoint interconnections become unpractical since a large number of optical couplers, taps, and splitters are required and, thus, are constrained by their physical dimensions. Furthermore, these optical couplers, taps and splitters are highly sensitive to the modal distribution of the optical signal; thereby, limiting their use because of modal sensitivity.

Attempts to increase the degree of optical connectivity (number of multipoint ot multipoint interconnections) have focused on the utilization of free space as a transmission media. For example, an array of light emitting devices can be imaged to an array of light detecting devices, establishing high bandwidth interconnections. By placing optical elements such as holograms, diffraction gratings, cylindrical lenses and prisms in the system, arrays of light emitting devices can be imaged to multiple arrays of light detecting devices. See, for example, W. B. Veldkamp et al., *Optics Letters*, Vol. 11 pp. 303–305 (1986); J. W. Goodman et al., *Proc. of the IEEE*, Vol. 72, No. 7, July 1984, pp. 850–863; H. J. Caufield, *Applied Optics*, Vol. 26, No. 19, October 1987, pp. 4039–4040; and A. W. Lohmann et al., *Applied Optics*, Vol. 25, No. 10, May 1986, pp. 1530–1531. In these optical arrangements, one point is connected over a high bandwidth channel simultaneously to various other points. The degree of connectivity in these instances, however, is outweighed by coupling loss, physical complexity, wavelength sensitivity, or coherence effects that precludes their wide scale commercial use.

SUMMARY OF THE INVENTION

This invention overcomes the drawbacks of the prior art methods of interconnections by using in a new manner a non-collinear arrangement of lenses, i.e., the optical axes of two or more lenses are parallel, but offset in the radial direction. Specifically, in the context of free space transmission, where an array of light emitting devices is imaged to arrays of light detecting devices, this invention provides a higher degree of connectivity without the prior art limitations that result from wavelength sensitivity or coherence effects. As a result of utilizing different portions of the same lens in a technique called pupil division, the non-collinear lens arrangement affords the simultaneous broadcasting of optical signals to a plurality of light detecting devices.

In a preferred embodiment, the optical system comprises a first pupil lens, a second pupil lens and an array of fanout lenslets wherein the optical axes of the first and second pupil lenses are collinear. The first and second pupil lenses form an afocal system with the array of fanout lenslets situated between and at the focal planes of the first and second pupil lenses. Light beams from arrays of light emitting devices are collimated by input probe lenses that have their optical axes positioned non-collinear with the optical axis of the first pupil lens. The first pupil lens forms a coincident pattern of the arrays of light emitting devices. Additionally, the array of fanout lenslets fans out exiting beamlets comprising the coincident pattern such that each exiting beamlet substantially fills the aperture of the second pupil lens. Output probe lenses, similar to the input probe lenses, are positioned around the periphery of the second pupil lens. Each output probe lens images a representation of the coincident pattern to an array of light detecting devices, resulting in the establishment of a plurality of optical interconnections.

BRIEF DESCRIPTION OF THE DRAWING

The invention will be more readily understood after reading the following detailed description of specific illustrative embodiments of the invention in conjunction with the appended drawings wherein:

FIG. 7 shows the array pattern for the light emitting devices of the optical arrangement depicted in FIG. 6; and FIG. 8 shows a coincident pattern formed at an intermediate point in the optical arrangement depicted in FIG. 6.

DETAILED DESCRIPTION

Optical arrangements in accordance with the teachings herein may be used to interconnect various nodes over high bandwidth channels. The inventive optical arrangements afford multipoint to multipoint interconnections by utilizing the concept of pupil division in conjunction with a non-collinear arrangement of lenses. The concept of pupil division is based on the well known principle that any portion of an optical lens will form an image. For example, if a lens is subdivided into several pieces, each piece will retain its original imaging properties and, hence, form an image. Similarly, if rays from different objects are incident on different portions of the same lens, the lens would simultaneously image all the objects. In effect, the pupil of the lens is being divided for use by different objects or sources. It should be noted, however, that in utilizing separate portions of a single lens, fewer light rays will pass through the lens and the image formed will not be as bright.

Figure 1:
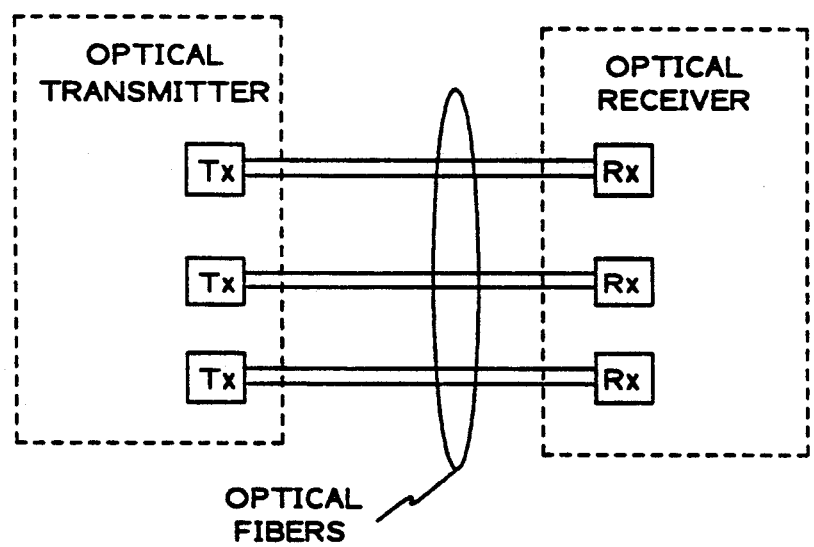
FIG. 1 shows a prior art interconnection arrangement for optical interconnections.
Figure 2:
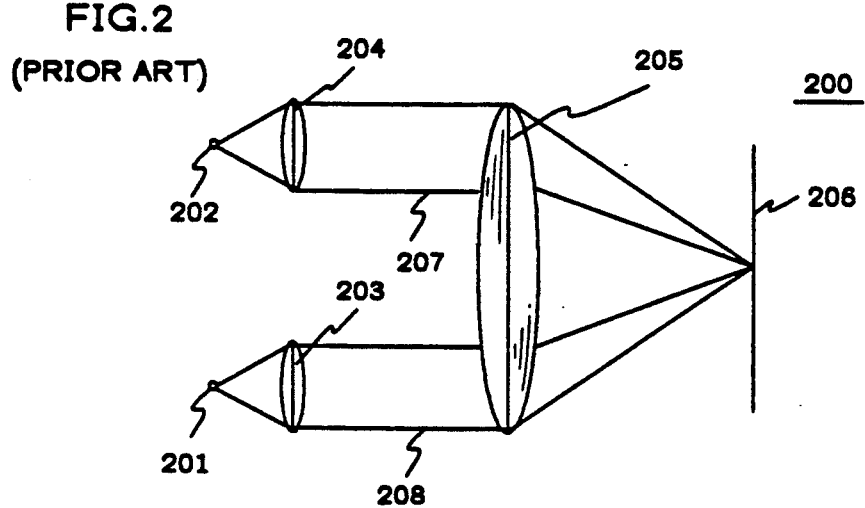
FIGS. 2 and 3 illustrate optical arrangements useful in describing the concept of pupil division.
Figure 3:
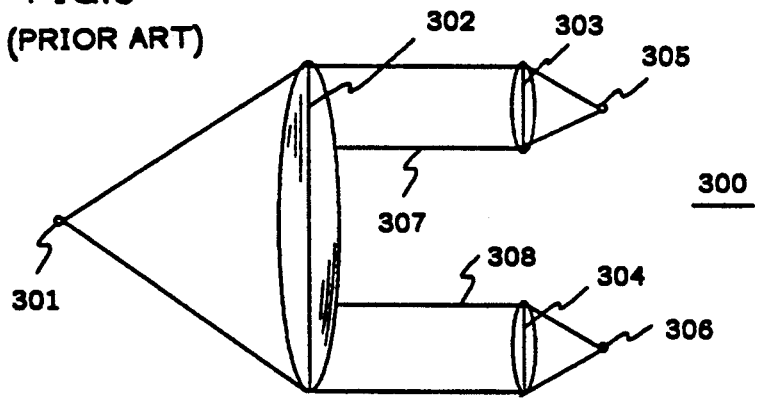

The concept of pupil division is best understood by referring to FIGS. 2 and 3. In FIG. 2, optical arrangement 200 is shown for merging the images of two light emitting devices. Light emitting devices 201 and 202 are each placed at focal planes of input probe lenses 203 and 204, respectively. Light emitting devices 201 and 202 may be, for example, LEDs, lasers, illuminated fiber ends or the like. Each input probe lens and its respective light emitting device is positioned near the perimeter of pupil lens 205. Specifically, the optical axes of the input probe lenses are positioned parallel and radially offset to the optical axis of pupil lens 205. The input probe lenses and the pupil lens have focal lengths of $f_p$ and $f_1$, respectively. Rays from light emitting devices 201 and 202 form collimated beamlets, 208 and 207, respectively, which impinge on different portions of pupil lens 205. In effect, pupil lens 205 has been divided into two sections (i.e. pupil division) for simultaneous use by light emitting devices 201 and 202. Pupil lens 205 focuses collimated beamlets, 207 and 208, to focal plane 206 and, thus, forms a coincident image of light emitting devices 201 and 202. In other words, the images of devices 201 and 202 have merged into one, along with any optical signals broadcasted therefrom. Since the light emitting devices have finite dimensions, their images will be magnified by the ratio $f_1/f_p$, and inverted top to bottom and left to right.

Optical arrangement 300, shown in FIG. 3, is similar to optical arrangement 200, but reversed left to right with light emitting device 301 positioned at the focal point of pupil lens 302. Light detecting devices, 305 and 306, are placed at the respective focal points of output probe lenses 303 and 304. Pupil lens 302 collimates rays from light emitting device 301. Portions of the collimated beam, beamlets 307 and 308, are focused by output lenses 303 and 304, respectively. In this arrangement, an identical image in each of the focal planes of output probe lenses, 303 and 304, will be formed of light emitting device 301. Analogous to optical arrangement 200, the images will be magnified by the ratio $f_p/f_1$ and, also, inverted top to bottom and left to right. The optical arrangement effectively utilizes simultaneously different portions of pupil lens 302 via beamlets 307 and 308. Those skilled in the art will appreciate that optical arrangement 300 affords a fan-out or broadcast capability. That is, multiple images are formed from one source, establishing multiple optical interconnections: device 301 to device 305 and device 301 to device 306.

Figure 4:
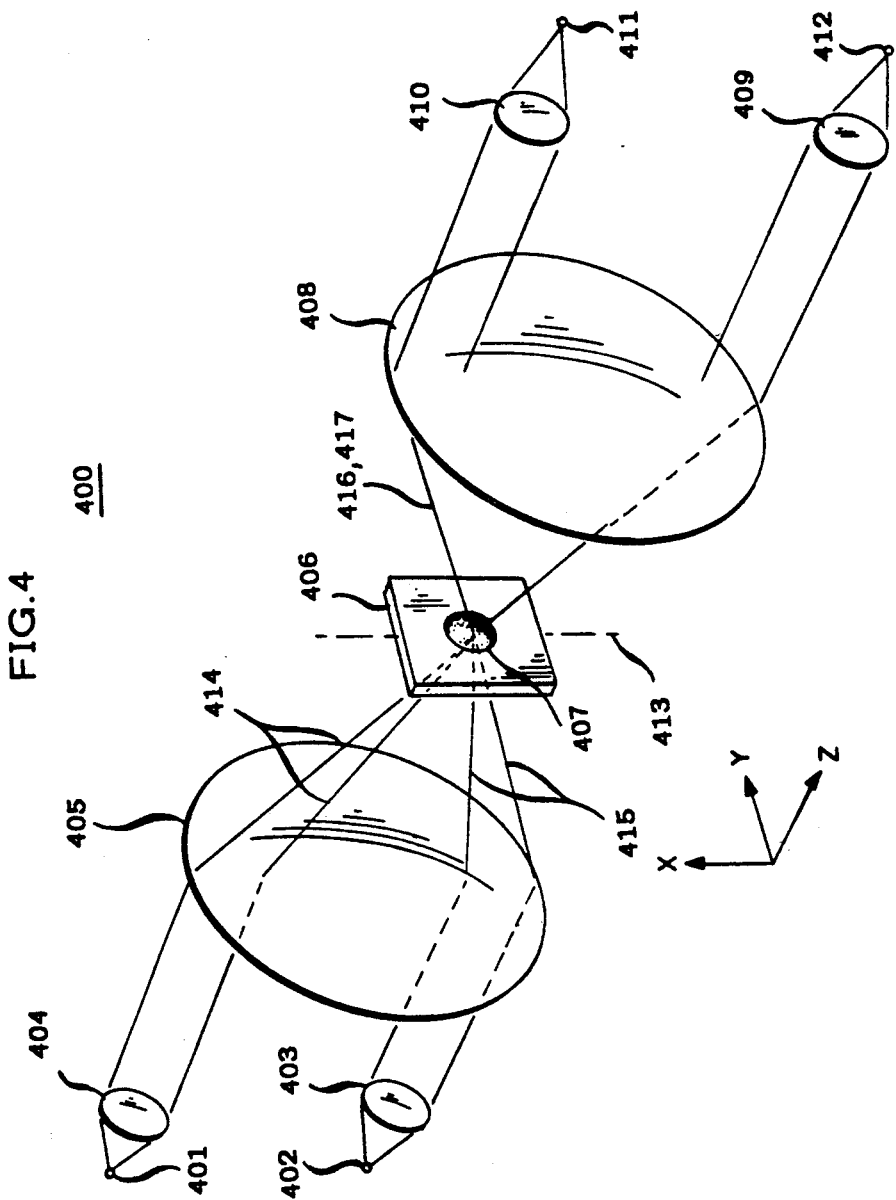
FIGS. 4 and 6 show exemplary optical arrangements in accordance with the principles of the invention.

An inventive optical arrangement for multipoint to multipoint interconnections is shown in FIG. 4. Those skilled in the art will recognize, based on the teachings hereinabove, that optical arrangement 400 is implemented by cascading optical arrangement 200 and optical arrangement 300 with interposed fan-out means 406. Fan-out means 406 increases the divergence angles of beamlets incident thereon, such as beamlets 414 and 415. Furthermore, pupil lenses 405 and 408 form an afocal system. That is, collimated beamlets incident on pupil lens 405 exit pupil lens 408 substantially collimated. A coincident image of light emitting devices, 401 and 402, is formed at focal plane 413 by pupil lens 405 in combination with input probe lenses 403 and 404. Fan-out means 406 comprising of high index of refraction and short focal length spherical ball lens 407 increases the divergence angles of beamlets 414 and 415, as indicated by the resulting divergence angles of substantially coincident beams 416 and 417. The fanning-out of beamlets, 414 and 415, into beams, 416 and 417, also insures that light rays from both beamlets, 414 and 415, each substantially fills the aperture of pupil lens 408.

Figure 5:
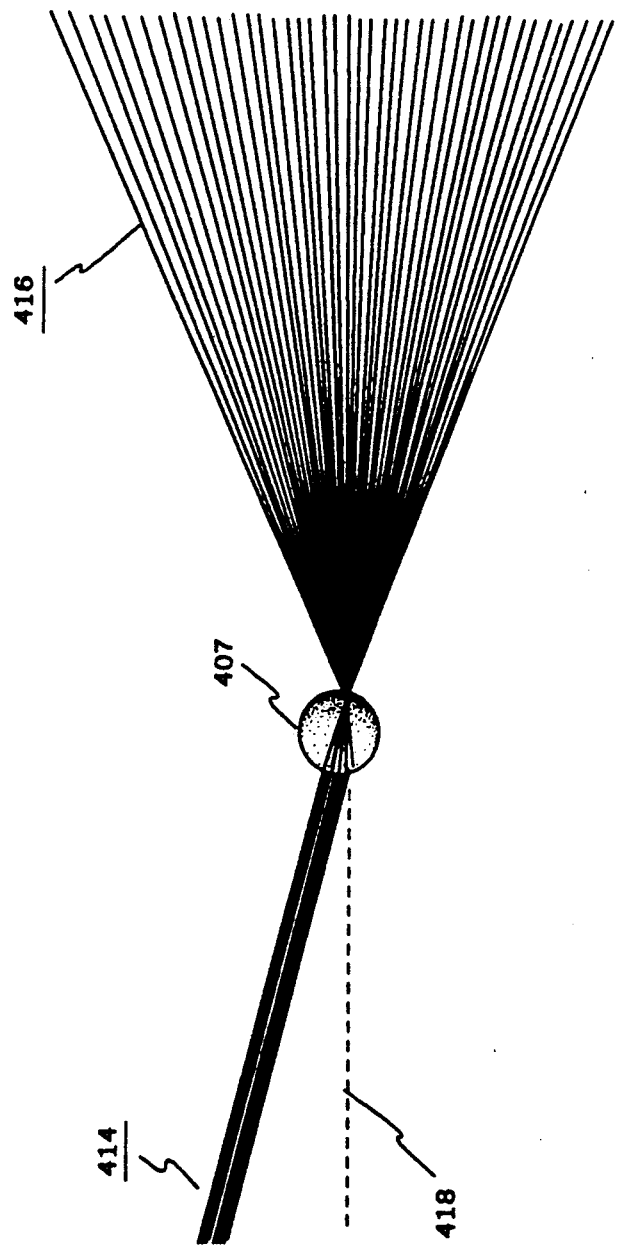
FIG. 5 shows an expanded view of the fan-out means in FIG. 4.

Illustrated in FIG. 5 is a magnified view of beamlet 414, spherical ball lens 407 and beam 416. The divergence angle of beamlet 414 from lens 413 has increased and, moreover, is symmetric with horizontal optic axis 418. The short focal length of ball lens 407, in comparison to the focal length of pupil lens 405, coupled with the ball len's large field of view provides a diffusion effect or fanning-out of entering rays, such as beamlets 414 and 415.

Output probe lenses 409 and 410 each images the coincident image of light emitting devices, 401 and 402, to light detecting devices 411 and 412. Hence, light impinging on devices 411 and 412 is proportional to the summation of light from both light emitting devices 401 and 402. It should be noted, following from the discussion of optical arrangement 400, that free space optical interconnections between the light emitting devices and the light detecting devices have been established: device 401 to device 411, device 401 to device 412, device 402 to device 411 and device 402 to device 412.

Figure 6:
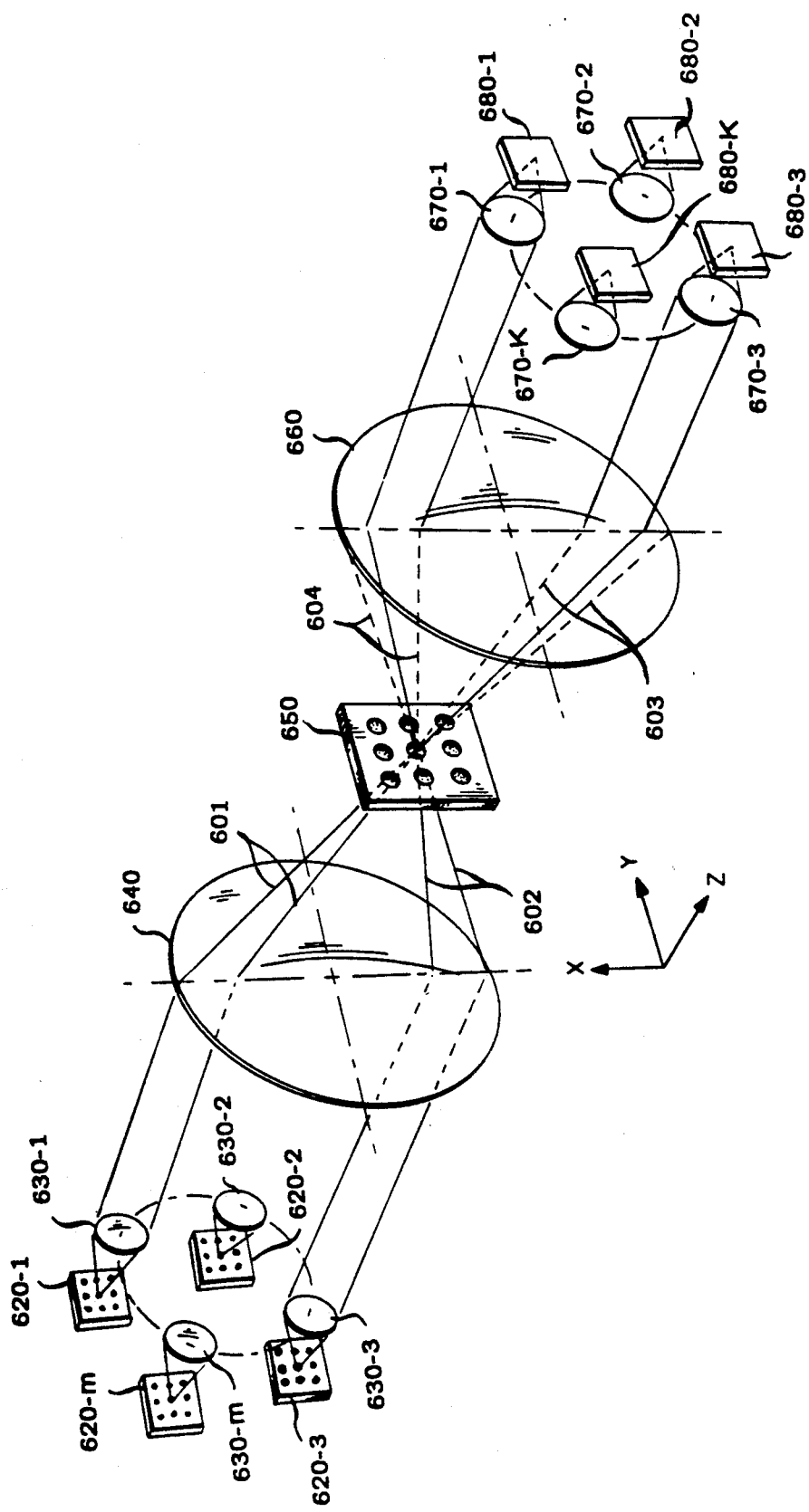

FIG. 6 illustrates another exemplary embodiment of the invention. Rectangular areas, 620-1 through 620-M, represent arrays of lighting emitting devices. Arrays, 620-1 through 620-M, each comprises a $N \times N$ array of light emitting devices, $[a_{i,j}]_M$, positioned in substantially identical patterns, where i denotes a row position, j a column position and M an array position. Similarly, rectangular areas, 680-1 through 680-K, represent arrays of light detecting devices. Arrays, 680-1 through 680-K, each comprises a $N \times N$ array of light detecting devices, $[b_{i,j}]_K$, with a similar identification scheme as for the light emitting devices. Furthermore, the light detecting devices within each array are positioned in a substantially identical pattern as that of the light emitting devices. It is realized, of course, that a magnification or reduction between the two patterns is possible, but for purposes of this description and for the sake of simplicity, a magnification factor of one is assumed.

It is desired to image, that is, connect each light emitting device in the M $N \times N$ arrays, 620-1 through 620-M, to at least one light detecting device of each K $N \times N$ arrays, 680-1 through 680-K, in order to establish multiple interconnections between light emitting and light detecting devices. If the optical signal emitted and detected are labeled with their associated light emitting device and the light detecting device, respectively, the interconnections desired can be expressed in a matrix form as $$[b_{i,j}]_K \propto \sum_M [a_{i,j}]_M.$$

For example, light detecting device, $[b_{1,1}]_1$ (first row and first column of the first array), has an optical signal impinging thereon that is proportional to the summation of all optical signal emitted from light emitting devices in the first row and first column of arrays 620-1 through 620-M. In effect, multiple free space interconnections are established: $[b_{1,1}]_1$ to $[a_{1,1}]_1$, $[a_{1,1}]_2$ ... and $[a_{1,1}]_M$. Also, interconnections analogous to the above example are concurrently established for other values of i, j and K in accordance with the above matrix equation. It will be apparent to those skilled in the art that some of these interconnections may be eliminated by electronically, mechanically, or optically disabling associated light emitting devices and, thus, establish a predetermined interconnection scheme. Furthermore, optical signals simultaneously impinging on the light detecting devices may be either time division multiplexed or wavelength division multiplexed. Although in this particular embodiment the arrays of light detecting and light emitting devices are symmetric, asymmetric arrays may also be used.

Each of the M N×N arrays of light emitting devices, 620-1 through 620-M, is placed at the focal plane of input probe lenses, 630-1 through 630-M, respectively. Input probe lenses, 630-1 through 630-M, have a focal length of $f_p$. Thus, light that is emitted from a light emitting device is collimated by its respective input probe lens, wherein the resulting collimated beamlet propagates with propagation directions of an angle $\theta$ with respect to the optical sagittal plane and an angle $\alpha$ with respect to the optical tangential plane of its respective input probe lens. The propagation directions $\theta$ and $\alpha$ are given by the following equations:

$$\theta = \tan^{-1} d_y/f_p$$

$$\alpha = \tan^{-1} d_x/f_p$$

wherein $d_y$ = the light emitting device's position in the y-axis with respect to its input probe len's optical axis $d_x$ = the light emitting device's position in the x-axis with respect to its input probe len's optical axis.

Each input probe lens and its associated array of light emitting devices is positioned around the perimeter of pupil lens 640. The optical axis of each input probe lenses is parallel with and a radial distance, r, away from the optical axis of pupil lens lens 640.

It is well known that a collimated beamlet propagating with propagation directions of angles $\theta$ and $\alpha$, defined above, through a lens having a focal length of $f_1$, such as pupil lens 640, is imaged at the focal plane of the lens at distances $f_1 \tan\alpha$ from the optical axis in the x-direction and $f_1 \tan\theta$ from the optical axis in the y-direction. All collimated beamlets propagating through pupil lens 640 having the same propagation direction are focused to the same spatial coordinates. Extending this concept to all the arrays of light emitting devices, then, a coincident pattern identical to the pattern associated with the light emitting devices will be formed at the focal plane of pupil lens 640. However, a point within the coincident pattern, unlike the original pattern of the arrays of light emitting devices, will consist of M coincident points which originated from beamlets having the same propagation directions.

The point, that in the coincident pattern each point consists of M points, is best illustrated by referring to FIGS. 7 and 8. A cross-sectional view of light emitting device array 620-1 is shown in FIG. 7. Arrays, 620-2 through 620-M, also have an idential pattern as 620-1. At the focal plane of pupil lens 640, coincident pattern 801, as illustrated in FIG. 8, is formed. Notice that coincident pattern 801, other than a magnification factor, and an inversion from top to bottom and left to right, is identical to pattern 701 of the light emitting device arrays. Light emitting devices that were in different arrays, but having the same spatial position (the same row and column), were imaged to the same point. Pupil lens 640, in effect, is spatially invariant for collimated light. Only the propagation directions of the collimated light determine the spatial location in the focal plane of pupil lens 640. Also, it should be noted that portions of the pupil lens through which the collimated beamlets pass do not determine the spatial location of the focused light thereof. This is a natural extension of pupil division, discussed hereinabove, that any portion of a lens will form an image of a object at the same focus plane. For example, collimated beamlets from devices $[a_{2,2}]_1$ and $[a_{2,2}]_2$, after propagating through their respective input probe lens, have identical propagation direction $(\theta, \alpha)$ and, although, passing through different portions of pupil lens 640 are focused to the same spatial location at the focal plane of pupil lens 640. This is also similarly true for other light emitting devices having the same relative position within their array.

Based on the teachings herein, relating to optical arrangement 300, an arrangement of pupil lens 640 and input probe lenses, 620-1 through 620-M, but reversed left to right will form, in each of the focal planes of the input probe lenses, an identical image of an object or pattern placed in the focal plane of the pupil lens. This fanout or broadcasting capability assumes, however, that the beamlets comprising, and exiting, the object or pattern substantially illuminate the aperture of pupil lens 640.

Pupil lens 660 and output probe leneses, 670-1 through 670-K are optically arranged similar to pupil lens 640 and input probe lenses, 620-1 through 620-M. It was shown above that coincident pattern 801 of light emitting device arrays, 620-1 through 620-M, was formed at the focal plane of pupil lens 640. If exiting beamlets comprising coincident pattern 801 can be made to substantially fill the aperture of pupil lens 660, then output probe lenses, 670-1 through 670-K, will each form an identical image of coincident pattern 801 at its respective focal plane, similar in operation to optical arrangement 300.

Beamlets from two of the possible M light emitting device arrays, positioned in the second row and second column of each array, are shown in FIG. 6. Beamlets 601 and 602 converge at the focal plane of pupil lens 640. Similarly, this occurs for all other beamlets from the other light emitting devices and, for the sake of simplicity, these beamlets are not shown. Beamlets 603 and 604 result if beamlets 601 and 602 are allowed to propagate unaltered. In such a case, the beamlets, however, do not substantially fill pupil lens 670 as required to achieve the fan-out capability and necessary to establish multiple interconnections. Coincident pattern 801 comprises a pattern of discrete finite images. Thus, array 650 comprising high index of refraction and short focal length ball lenses is arranged in a pattern identical to coincident pattern 801. Furthermore, array 650 increases, i.e., fans out, the divergence angle of each beamlet comprising coincident pattern 810 by a respective ball lens within the array.

Light detecting device arrays, 680-1 through 680-K, are place at the focal plane of output probe lenses, 670-1 through 670-K, respectively, in a corresponding pattern as pattern 701. Each array has an image of coincident pattern 801 imaged thereon, but reversed left to right and top to bottom which allows for multiple interconnections to be established in accordance with the matrix relationship above.

In one example from experimental practice utilizing optical arrangement 400, illuminated 100 micron core fibers were used as light emitting devices 401 and 402. Also, 200 micron fibers terminated to avalanche photodetectors were employed as light detecting devices 411 and 412. Input probe lenses 402 and 403 and output probe lenses 410 and 409 were 18 mm diameter lenses with a focal length of 40 mm while pupil lenses 414 and 416 were 80 mm diameter lenses having a 160 mm focal length. Ball lens 413 was 1 mm in diameter and had an index of refraction of 1.9. Furthermore, the 100 micron fibers were illuminated with laser diodes that operated at a wavelength of 780 nm. Error free performance was obtained over a five day period at a data rate of 700 Mbps. The maximum interconnection loss between light emitting devices and light detecting devices was less than 25 dB while the crosstalk between channels formed by the interconnections was measured to be greater than 30 dB.

It should be noted that the optical arrangements in FIGS. 4 and 6 are not lossless. Only a fraction of the total energy impinging on pupil lens, 408 or 660, is received by probe lenses, 409 and 410, or, 670-1 through 670-K, respectively. Specifically, the fraction of power delivered to each probe lens is the ratio of the area of the output probe lens to the area of the pupil lens. Also, neither the optical arrangement in FIG. 4 nor FIG. 6 relies on polarization, coherence or the wavelength of the light emitting devices for operation, other than the slight dependency of the lenses' focal length on wavelength.

In establishing connectivity from light emitting devices to light detecting devices, it was found that the degree of coupling was highly sensitive to the positioning error of both the ball lenses and/or the light detecting devices. Furthermore, pupil lenses due to their large field of view exhibit a high degree of field curvature. Field curvature compensation plates may be used to alleviate this problem. Also field curvature, opposite in sign to that of the pupil lenses, may be introduced within other optical elements to minimize the effects.

It is understood that the embodiments described herein are merely illustrative of the principles of the invention. Optical elements within the inventive optical arrangements described herein could be replaced by mirrors. Also, various other optical elements may be included in fanout means 406 or 650, such as holographical lenses, graded index lenses, diffusion screens or the like, which will embody the principles of the invention and fall within the scope thereof. Utilizing holographical lenses, however, will imposed limitations associated with the characteristic properties thereof. Furthermore, the light emitting devices may be optically modulated by electro-optic means, including Pockels cell or self-electrooptic effect devices.

I claim:
1. An optical arrangement comprising:
first and second arrays of light emitting devices, each array arranged in a first pattern for generating first and second input sets of beamlets, respectively;
first and second input probe lenses for collimating said first and second input sets of beamlets into first and second sets of input collimated beamlets, respectively;
a first lens for focusing said first and second sets of input collimated beamlets into a coincident pattern of said first and second input sets of beamlets, said first and second input probe lens being non-collinear with said first lens;
a second lens having an optical axis substantially collinear with the optical axis of said first lens;
an array of lenslets arranged in accordance with said coincident pattern, said array of lenslets positioned between said first and second lenses for expanding said coincident pattern of first and second input sets of beamlets into expanded beamlets such that each of said expanded beamlets substantially fills the aperture of said second lens; and
an output lens for focusing at least a portion of said expanded beamlets from said second lens into a representation of said coincident pattern.

2. The optical arrangement as defined in claim 1 wherein said output lens is positioned to have its optical axis substantially parallel with the optical axes of said first and second lenses.

3. The optical arrangement as defined in claim 1 wherein said at least first input probe lens is positioned to have its optical axis a radial distance, r, away from the optical axis of said first lens.

4. The optical arrangement as defined in claim 1 wherein said at least second input probe lens is positioned to have its optical axis a radial distance, r, away from the optical axis of said first lens.

5. The optical arrangement as defined in claim 1 wherein said first and second lenses establish an afocal optical system.

6. The optical arrangement as defined in claim 5 wherein said first and second lenses have substantially the same focal length.

7. The optical arrangement as defined in claim 6 wherein said array of lenslets includes a spherical lens.

8. The optical arrangement as defined in claim 6 wherein said array of lenslets includes a graded index lens.

9. The optical arrangement as defined in claim 6 wherein said array of lenslets includes a holographical lens.

* * * * *